(12) United States Patent
Murata et al.

(10) Patent No.: US 6,779,931 B2
(45) Date of Patent: Aug. 24, 2004

(54) OPTICAL FIBER CONNECTING ELEMENT AND ALIGNMENT SLEEVE

(75) Inventors: Norio Murata, Tokyo (JP); Satoru Tomaru, Tokyo (JP); Mitsunori Sato, Tokyo (JP); Yoshikazu Ishii, Tokyo (JP); Nobukazu Murata, Kisarazu (JP); BooSeok Hwang, Tokyo (JP); Haruo Ishihara, Maruko-machi (JP)

(73) Assignees: NIT Advanced Technology Corporation of Tokyo (JP); Telecom Assist Corporation of Chiba (JP); Richstone Limited of Tokyo (JP); Ishihara Techno Co., Ltd. of Nagano (JP)

( * ) Notice: Subject to any disclaimer, the term of this patent is extended or adjusted under 35 U.S.C. 154(b) by 88 days.

(21) Appl. No.: 10/287,112

(22) Filed: Nov. 4, 2002

(65) Prior Publication Data

US 2003/0091293 A1 May 15, 2003

(30) Foreign Application Priority Data

Nov. 2, 2001 (JP) .................................... 2001-338296
Mar. 22, 2002 (JP) .................................... 2002-081957

(51) Int. Cl.[7] .............................. G02B 6/00; G02B 6/255
(52) U.S. Cl. ........................................... 385/98; 65/385
(58) Field of Search ........................... 385/88–100, 147

(56) References Cited

U.S. PATENT DOCUMENTS 6,547,779 B2 * 4/2003 Levine et al. .................. 606/7
2003/0009157 A1 * 1/2003 Levine et al. .................. 606/7
2003/0065316 A1 * 4/2003 Levine et al. .................. 606/33
2003/0091293 A1 * 5/2003 Murata et al. .................. 385/70

OTHER PUBLICATIONS

Lothar Finzel et al., "The Finger Splice–A Toolless Mechanical Splice for Optical Fibers", pp. 390–393, International Wire & Cable Symposium Proceedings, 1989;–(no date).

Masao Tachikura et al., "Fusion Mass–Splices for Optical Fibers Using High–Frequency Discharge", pp. 25–31, Journal of Lightwave Technology, vol. LT–2, No. 1, Feb. 1984, (no date).

Y. Ruello et al., "A New Multimode Optical Fiber Splicing Technique ", pp. 95–99, 35th International Wire & Cable Symposium Proceedings 1986, (no date).

* cited by examiner

*Primary Examiner*—Akm Enayet Ullah
(74) *Attorney, Agent, or Firm*—Pitney Hardin LLP

(57) ABSTRACT

It is an object of the present invention to enable quick, easy, and inexpensive connections even in a narrow area using an inexpensive device and an inexpensive optical fiber connecting element, thereby achieving high operability and high durability reliability. An optical fiber connecting element includes an optical alignment sleeve having tapered insertion ports formed at opposite ends thereof and having an ejection port opened in an area in which the two optical fibers inserted through the insertion ports are butted against each other, a cyanoacrylate-type glue injected into the insertion ports and the injection port to fix the two optical fibers, and a heat-shrinkable tube wrapped around the optical alignment sleeve and two optical fiber coatings and having a hot-melt adhesive provided therein.

19 Claims, 14 Drawing Sheets

OPTICAL FIBER CONNECTING ELEMENT AND ALIGNMENT SLEEVE

This application is based on Japanese Patent Application Nos. 2001-338296 filed Nov. 2, 2001 and 2002-081957 filed Mar. 22, 2002, the contents of which are incorporated hereinto by reference.

BACKGROUND OF THE INVENTION

1. Field of the Invention

The present invention relates to an optical fiber connecting element, an optical alignment sleeve, an optical fiber connecting method, and an optical fiber connecting device, and more specifically, to a method of fixedly connecting an optical fiber using an optical alignment sleeve filled with an adhesive.

2. Description of the Related Art

In laying an optical fiber cable, for example, a cable of unit length 2 km is laid in each section. Cables in two sections are connected together by connecting optical fibers in the cable in one of the sections to the corresponding optical fibers in the cable in the other section using a connection box called a "closure". A cable for long-distance transmissions requires a large number of closures, and a multicore cable requires optical fibers to be connected together a huge number of times. Accordingly, it is necessary to be able to connect optical fibers together more precisely and to reduce the number of times that the optical fibers are connected together, thereby achieving inexpensive and reliably durable optical-fiber connections.

Conventionally known methods of connecting optical fibers together include (1) heating and melting the optical fibers, i.e. so-called fusion splicing, (2) mechanically fixing the optical fibers in a connection box, i.e. so-called mechanical splicing, and (3) using transparent sleeves or V-type grooves with transparent covers to butt the optical fibers against each other and using an UV-curable adhesive to fixedly connect the optical fibers together, i.e. so-called adhesive splicing.

However, the fusion splicing requires an expensive fusion splicer, which is large and does not allow connections to be carried out easily in a narrow area. Another problem with the fusion splicing is that the optical fibers require an extra length sufficient to allow the fibers to be set in the fusion splicer and an extra length for a reconnection carried out if the fusion fails.

The mechanical splicing requires more inexpensive connection tools than the fusion splicing but requires an expensive connection element, a mechanical splice container, thereby increasing costs per connection. Another problem with the mechanical splicing is that the fixation of the optical fibers rely on mechanical clamping force, thereby degrading durability reliability.

Problems with the adhesive splicing are that UV irradiation, which involves high costs, are required and that ultraviolet rays are harmful to human bodies, resulting in degraded operability at the working site.

SUMMARY OF THE INVENTION

It is an object of the present invention to provide an optical alignment sleeve and an optical fiber connecting element that enable quick, easy, and inexpensive connections even in a narrow area, thereby achieving high operability and high durability reliability, and to provide an optical fiber connecting method and apparatus used for the optical alignment sleeve and the optical fiber connecting element.

To attain this object, an optical fiber connecting element comprises an optical alignment sleeve having tapered insertion ports formed at opposite ends thereof and through which optical fibers are inserted and having an ejection port opened in an area in which the two optical fibers inserted through the insertion ports are butted against each other, a cyanoacrylate-type glue injected into the insertion ports and the injection port to fix the two optical fibers, and a heat-shrinkable tube wrapped around the optical alignment sleeve and the two optical fibers and having a hot-melt adhesive provided therein.

Also an optical fiber connecting element may comprise an optical alignment sleeve having tapered insertion ports formed at opposite ends thereof and through which optical fibers are inserted and having an ejection port opened in an area in which the two optical fibers inserted through the insertion ports are butted against each other, a cyanoacrylate-type glue injected into the insertion ports and the injection port to fix the two optical fibers, a reinforcing tube wrapped around the optical alignment sleeve and the two optical fibers, and seal materials that fix the two optical fibers and the reinforcing tube at opposite ends of the reinforcing tube.

Further, an optical fiber connecting method comprises a first step of inserting two optical fibers into an optical alignment sleeve and butting the optical fibers against each other, the optical alignment sleeve having tapered insertion ports formed at opposite ends thereof and through which optical fibers are inserted and having an ejection port opened in an area in which the two optical fibers inserted through the insertion ports are butted against each other, a second step of injecting a cyanoacrylate-type adhesive into the insertion ports and the injection port to fix the two optical fibers, and a third step of wrapping a heat-shrinkable tube having a hot-melt adhesive provided inside, around the optical alignment sleeve and the two optical fibers and heating the heat-shrinkable tube to fix the optical alignment sleeve and the two optical fibers.

Furthermore, an optical fiber connecting method may comprise the steps of: inserting two optical fibers into an optical alignment sleeve and butting the optical fibers against each other, the optical alignment sleeve having tapered insertion ports formed at opposite ends thereof and through which optical fibers are inserted and having an ejection port opened in an area in which the two optical fibers inserted through the insertion ports are butted against each other, injecting a cyanoacrylate-type adhesive into the insertion ports and the injection port to fix the two optical fibers, and wrapping a reinforcing tube around the optical alignment sleeve and the two optical fibers and using seal materials to fix the two optical fibers at opposite ends of the reinforcing tube.

An optical alignment sleeve for optical fibers which allows two optical fibers to be butted against each other for connection, the optical alignment sleeve comprises tapered insertion ports through which optical fibers are inserted, and holding sections each having a groove formed therein to allow the optical fiber inserted through the insertion port to discharge an extra portion of an adhesive already filled in the optical alignment sleeve, to the insertion ports, and wherein the optical fibers inserted through the insertion ports allow the extra portion of the adhesive discharged to the insertion ports to form fillets.

Also the optical alignment sleeve may comprise tapered insertion ports through which optical fibers are inserted, and holding sections each having a drain section formed therein so that the optical fiber are inserted through the insertion port to discharge an extra portion of an adhesive already filled in the optical alignment sleeve, to the insertion ports, and wherein the optical fibers are inserted through the insertion ports to allow the extra portion of the adhesive discharged to the insertion ports to form fillets.

An optical fiber connecting method comprises a first step of inserting optical fibers into an optical alignment sleeve to discharge an extra portion of an adhesive already filled into holding sections of the optical alignment sleeve, to insertion ports formed at opposite ends of the optical alignment sleeve, via grooves formed in the holding sections, a second step of inserting the optical fibers into the optical alignment sleeve to allow the extra portion of the adhesive discharged to the tapered insertion ports to form fillets, and a third step of solidifying the adhesive to fix the optical alignment sleeve and the optical fibers.

Also an optical fiber connecting method comprise a first step of inserting optical fibers into an optical alignment sleeve to discharge an extra portion of an adhesive already filled into holding sections of the optical alignment sleeve, to insertion ports formed at opposite ends of the optical alignment sleeve, via grooves formed in the holding sections, a second step of inserting the optical fibers into the optical alignment sleeve to allow the extra portion of the adhesive discharged to the tapered insertion ports to form fillets, and a third step of solidifying the adhesive to fix the optical alignment sleeve and the optical fibers.

An optical fiber connecting device comprises optical alignment sleeve holding means for fixing an optical alignment sleeve, and optical fiber holding means having a clamp that fixes optical fibers in V-type groove and means for moving the clamp so as to allow the optical fibers to be inserted into the optical alignment sleeve and butted against each other therein, and wherein the clamp has a fixed cover that can be closed with the optical fibers temporarily fixed in the V-type groove formed in a clamp base, using one of the fingers, and the optical fibers are sandwiched between the clam base and the fixed cover in the V-type groove.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described below in detail with reference to the drawings.

[First Embodiment of Optical Alignment Sleeve]

The principle of a first embodiment of an optical alignment sleeve is that optical fibers are butted against each other in an optical alignment sleeve having an inner diameter 1 to 1 $\mu$m larger than the outer diameter of an optical fiber, and are fixedly connected together using cyanoacrylate-type glue. Furthermore, to improve intensity and durability reliability, a heat-shrinkable tube containing a hot-melt adhesive or a reinforcing tube and a seal material are used for packaging.

Figure 1A:
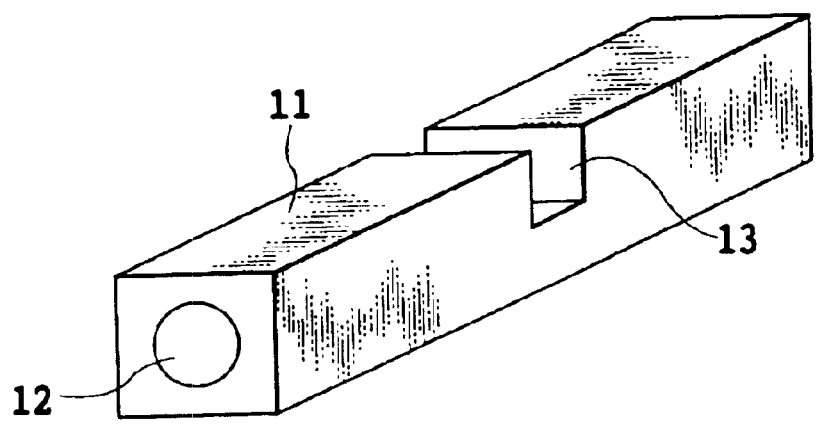
FIG. 1A is a perspective view showing an optical alignment sleeve according to a first embodiment of the present invention.
Figure 1B:
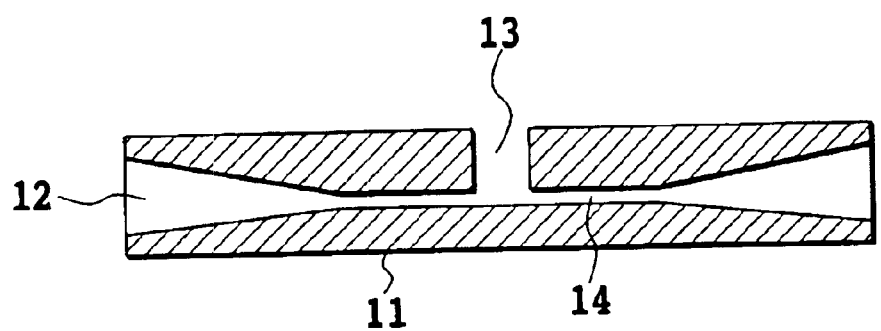
FIG. 1B is a sectional view showing the optical alignment sleeve according to the first embodiment of the present invention.

FIGS. 1A and 1B show an optical alignment sleeve according to a first embodiment of the present invention. An optical alignment sleeve 11 is used to butt optical fibers to be connected together, against each other. The optical alignment sleeve 11 has tapered insertion ports 12 and a guide section 14 which is contiguous to the insertion ports 12 and which has an inner diameter 1 to 2 $\mu$m larger than the outer diameter of the optical fibers. Further, the optical alignment sleeve 11 has, in a central portion of the sleeve, an injection port 13 through which an adhesive is injected to butt the optical fibers against each other in the center of the sleeve.

The optical alignment sleeve may be made of glass, metal, or plastics such as polyphenylene sulfide or liquid polymer, which has a small thermal expansion coefficient.

Figure 2:
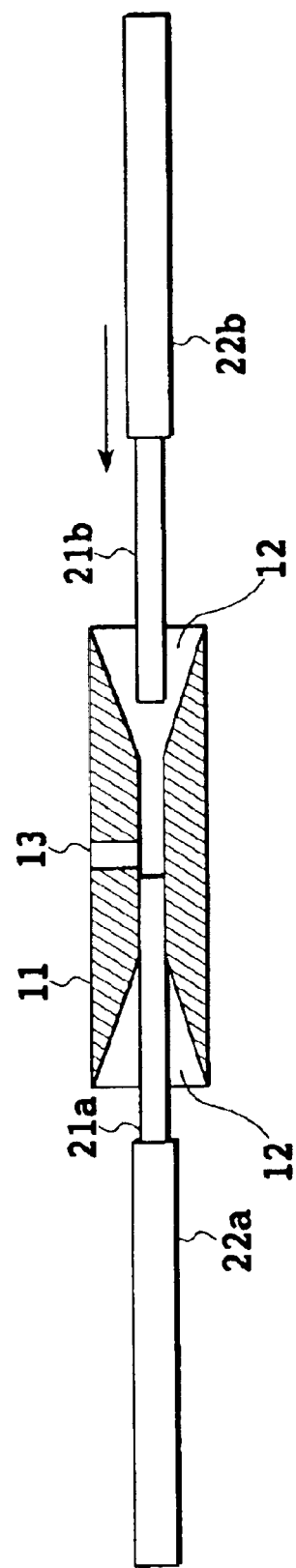
FIG. 2 is a sectional view showing a method of fixing optical fibers using an optical fiber connecting element.

FIG. 2 shows a method of fixing optical fibers using the optical alignment sleeve. Single-mode optical fibers 21a and 21b having an outer diameter of 0.125 mm are inserted into the optical alignment sleeve 11 made of glass and having an outer diameter of 0.127 mm and an outer diameter of 1.8 mm, and are butted against each other in the injection port 13. Ethyl cyanoacrylate instant glue is injected through the insertion ports 12 and the injection port 13 to fixedly connect the single-mode optical alignment fibers 21a and 21b together.

The cyanoacrylate glue is expressed by:

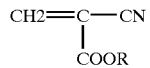

where R denotes $C_nH2_{n+1}$ (n is a positive integer between 1 and 16), i-butyl, i-propyl, or i-pentyl.

[First Embodiment of Optical Fiber Connecting Element]

Figure 3:
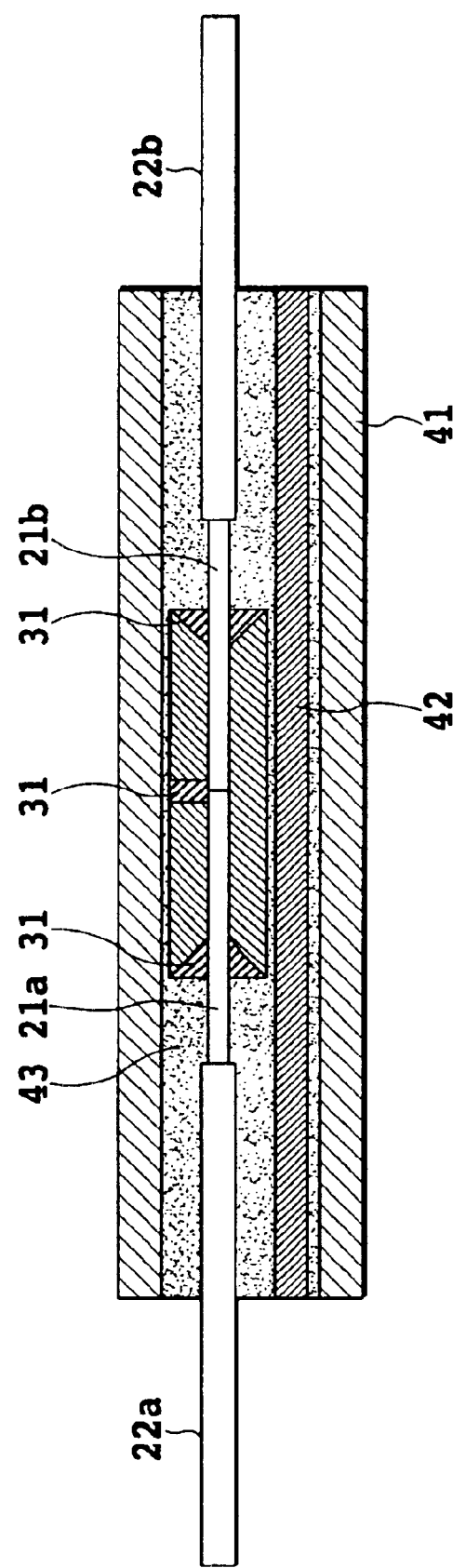
FIG. 3 is a sectional view showing an optical fiber connecting element according to the first embodiment of the present invention.

FIG. 3 shows an optical fiber connecting element according to the first embodiment of the present invention. A heat-shrinkable tube 41 and a reinforcing rod 42 are used to further reinforce the single-mode optical fibers 21a and 21b fixed in the optical alignment sleeve 11 using cyanoacrylate glue 31. The optical alignment sleeve 11, in which the optical fibers have been butted against each other are covered with the heat-shrinkable tube 41, already inserted through optical fiber coatings 22a and 22b. The heat-shrinkable tube 41 contains a reinforcing rod 42 and a hot-melt adhesive 43. Then, the heat-shrinkable tube 41 is heated to integrate the optical alignment sleeve 11 with the optical fiber coatings 22a and 22b for reinforcement.

The hot-melt adhesive 43 is a silane-grafted ethylene copolymer hot-melt adhesive shaped like a tube having an inner diameter of 2.0 mm, an outer diameter of 2.5 mm, and a length of 60 mm. The hot-metal adhesive 43 is provided inside the heat-shrinkable tube. Alternatively, a hot-melt adhesive may be applied to the inner surface of the heat-shrinkable tube. The hot-melt adhesive may be a high-durability EVA-type polymer, e.g. a high function polymer (trade name: HPR) commercially available from Mitusi Du Pont Polychemical Company.

The reinforcing rod 42 is a round bar made of metal, more specifically SUS and having an outer diameter of 1.2 mm and a length of 60 mm. The heat-shrinkable tube 41 is made of polyethylene and having an inner diameter of 4.2 mm, an outer diameter of 4.4 mm, a length of 60 mm, and a shrinkage factor of 40 to 50%.

In this case, the single-mode optical fibers 21a and 21b exhibited an insertion loss of 0.02 dB or less at a wavelength of 1.5 μm. In temperature cycling tests at −20 to +60° C., an optical fiber connected portion exhibited an optical loss change of 0.2 dB or less. The optical fiber connected portion had a peel strength of 2.3 kg and maintained a strength of 2 kg or more even after the fibers had been immersed in 60° C. water for two weeks.

[Other implementation]

The single-mode optical fibers 21a and 21b having an outer diameter of 0.125 mm are inserted into the optical alignment sleeve 11 made of polyphenylene sulfide and having an inner diameter of 0.127 mm, an outer diameter of 2 mm, and a length of 20 mm, and are butted against each other in the injection port 13. A high viscous propyl cyanoacrylate instant glue is injected into the insertion ports 12 to fixedly connect the single-mode optical fibers 21a and 21b together. Silicone-type matching oil is injected into the injection port 13. The injection port 13 is 0.2 mm in width. The insertion ports 12 have an inner diameter of 1.4 mm on a side thereof through which the optical fibers are inserted, and have an inner diameter of 0.127 μm at the boundary between each insertion port and the guide section 14. The thus fixed single-mode optical fibers 21a and 21b are reinforced with the heat-shrinkable tube 41 and the reinforcing rod 42.

In this case, the single-mode optical fibers 21a and 21b exhibited an insertion loss of 0.05 dB or less at a wavelength of 1.5 μm. In temperature cycling tests at −20 to +60° C., an optical fiber connected portion exhibited an optical loss change of 0.1dB or less. The optical fiber connected portion had a peel strength of 2 kg and maintained a strength of 2 kg or more even after the fibers had been immersed in 60° C. water for two weeks.

[Second Embodiment of Optical Fiber Connecting Element]

Figure 4:
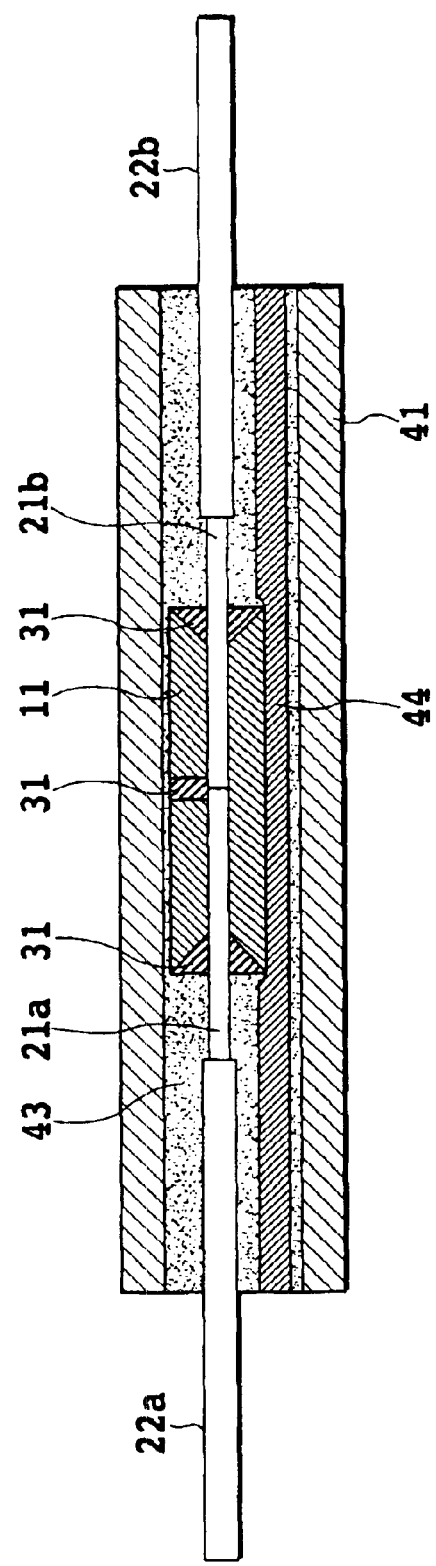
FIG. 4 is a sectional view showing an optical fiber connecting element according to a second embodiment of the present invention.

FIG. 4 shows an optical fiber connecting element according to a second embodiment of the present invention. The single-mode optical fibers 21a and 21b having an outer diameter of 0.125 mm are inserted into the optical alignment sleeve 11 made of glass and having an inner diameter of 0.127 mm, an outer diameter of 1.8 mm, and a length of 20 mm, and are butted against each other in the injection port 13. An ethyl cyanoacrylate instant glue is injected through the insertion ports 12 and the injection port 13 to fixedly connect the single-mode optical fibers 21a and 21b together. The optical alignment sleeve 11 in which the optical fibers have been butted against each other is covered with the heat-shrinkable tube 41. Then, the heat-shrinkable tube 41 is heated to integrate the optical alignment sleeve 11 with the optical fiber coatings 22a and 22b for reinforcement.

The heat shrinkable tube 41 contains a stepped reinforcing rod 44 and a hot-melt adhesive 43. The stepped reinforcing rod is more inexpensive and easier to handle when it is made of iron so as to be round. The reinforcing rod has a recessed central portion which contacts with the optical alignment sleeve. The central portion is recessed to form a step because this hinders stress induced by thermal expansion or contraction of the hot-melt adhesive or heat shrinkable tube from acting on portions of the optical fibers located near the inlet and outlet of the optical alignment sleeve when the hot-melt adhesive is cooled or the temperature of the operating environment changes.

In this case, the single-mode optical fibers 21a and 21b exhibited an insertion loss of 0.01 dB or less at a wavelength of 1.5 μm. In temperature cycling tests at −20 to +60° C., an optical fiber connected portion exhibited an optical loss change of 0.1 dB or less. The optical fiber connected portion had a peel strength of 2 kg and maintained a strength of 2 kg or more even after the fibers had been immersed in 60° C. water for two weeks.

[Third Embodiment of Optical Fiber Connecting Element]

Figure 5:
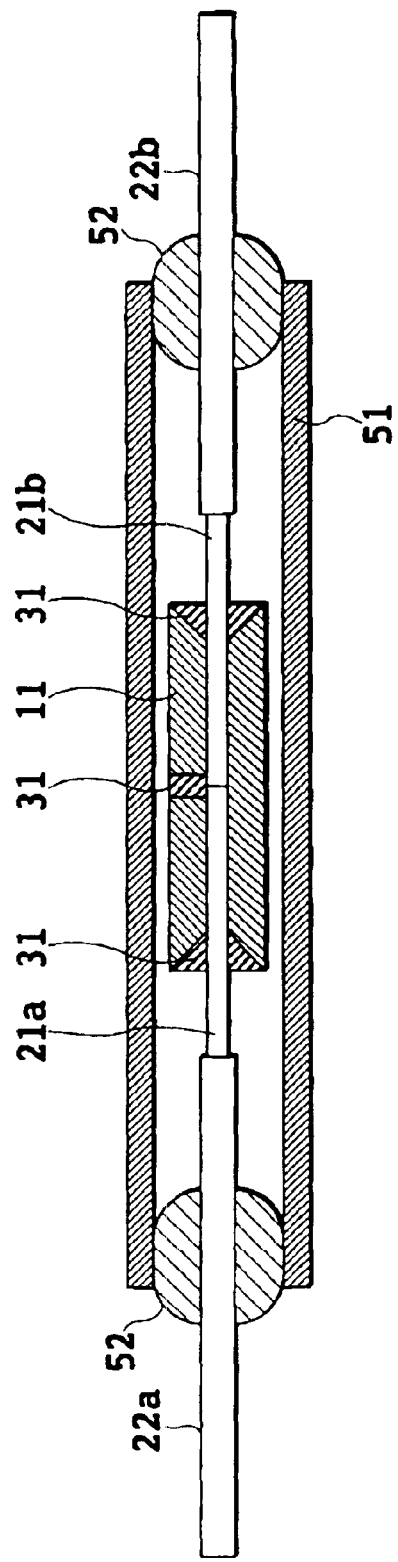
FIG. 5 is a sectional view showing an optical fiber connecting element according to a third embodiment of the present invention.

FIG. 5 shows an optical fiber connecting element according to a third embodiment of the present invention. The single-mode optical fibers 21a and 21b having an outer diameter of 0.125 mm are inserted into the optical alignment sleeve 11 made of glass and having an inner diameter of 0.127 mm, an outer diameter of 1.8 mm, and a length of 20 mm, and are butted against each other in the injection port 13. An ethyl cyanoacrylate glue is injected through the insertion port 12 and the injection ports 13 to fixedly connect the single-mode optical fibers 21a and 21b together. The optical alignment sleeve 11, in which the optical fibers are butted against each other, is covered with a reinforcing tube 51 already inserted through the optical fiber coatings 22a and 22b. Then, a room temperature setting moisture-proof seal materials 52 are provided at the respective ends of the reinforcing tube 51 to bond the reinforcing tube 51 and the optical fiber coatings 22a and 22b together to seal the reinforcing tube 51.

The reinforcing tube 51 is a pipe made of stainless steel and having an outer diameter of 3 mm and an inner diameter of 1.6 mm. The reinforcing tube made of metal, particularly stainless steel is difficult to rotten and is inexpensive.

In this case, the single-mode optical fibers 21a and 21b exhibited an insertion loss of 0.02 dB or less at a wavelength of 1.5 μm. In temperature cycling tests at −20 to +60° C., the optical fiber connected portion exhibited an optical loss change of 0.1 dB or less. The optical fiber connected portion had a peel strength of 1.5 kg and maintained a strength of 1 kg or more even after the fibers had been immersed in 60° C. water for two weeks.

[Second Embodiment of Optical Alignment Sleeve]

The principle of a second embodiment of the optical alignment sleeve is that an adhesive is filled beforehand into an optical alignment sleeve having an inner diameter 1 to 2 μm larger than the outer diameter of the optical fibers and that the optical fibers are then inserted through tapered insertion ports located at the respective ends of the optical alignment sleeve and are butted against each other and fixedly connected together. When the optical fibers are inserted, an extra portion of the adhesive is moved to the opposite ends of the optical alignment sleeve through a drain ditch to fix the optical fibers, optical fiber coatings, and optical alignment sleeve together, thereby sealing the optical fibers.

Figure 6:
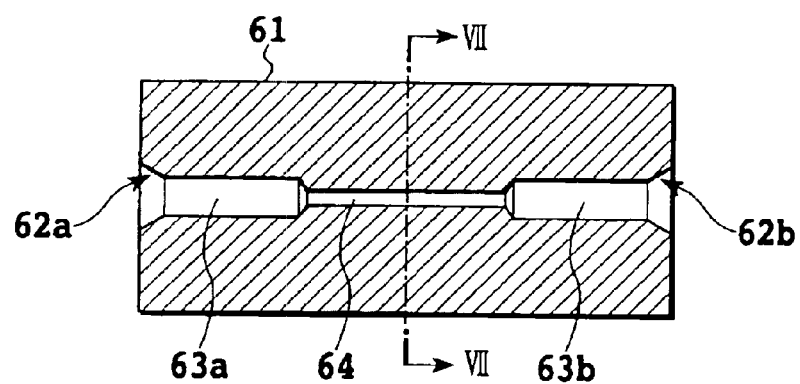
FIG. 6 is a sectional view showing an optical alignment sleeve according to the second embodiment of the present invention.

FIG. 6 shows an optical alignment sleeve according to the second embodiment of the present invention. An optical alignment sleeve 61 is composed of tapered insertion ports 62a and 62b through which the optical fibers 21a and 21b are inserted, larger-diameter holding sections 63a and 63b in which the optical fiber coatings 22a and 22b are held, and a smaller-diameter holding section 64 in which the optical fibers 21a and 21b are held. The optical alignment sleeve 61 may be made of glass, metal, or plastics such as polyphenylene sulfide or liquid polymer, which has a small thermal expansion coefficient.

Figure 7:
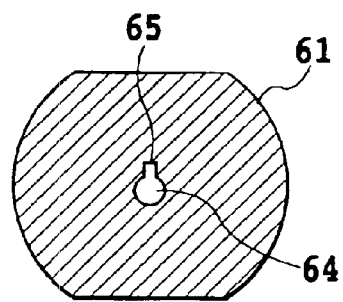
FIG. 7 is a transverse sectional view of a central portion of the optical alignment sleeve according to the second embodiment of the present invention.

FIG. 7 is a transverse sectional view of a central portion of the optical alignment sleeve. This is a transverse sectional view of the smaller-diameter holding section 64, taken along line VII—VII in FIG. 6. The smaller-diameter holding section 64 has a rectangle drain ditch 65 through which the adhesive is discharged. The drain ditch 65 is continuously formed in the larger-diameter holding sections 63a and 63b and is connected to the insertion ports 62a and 62b.

Figure 8:
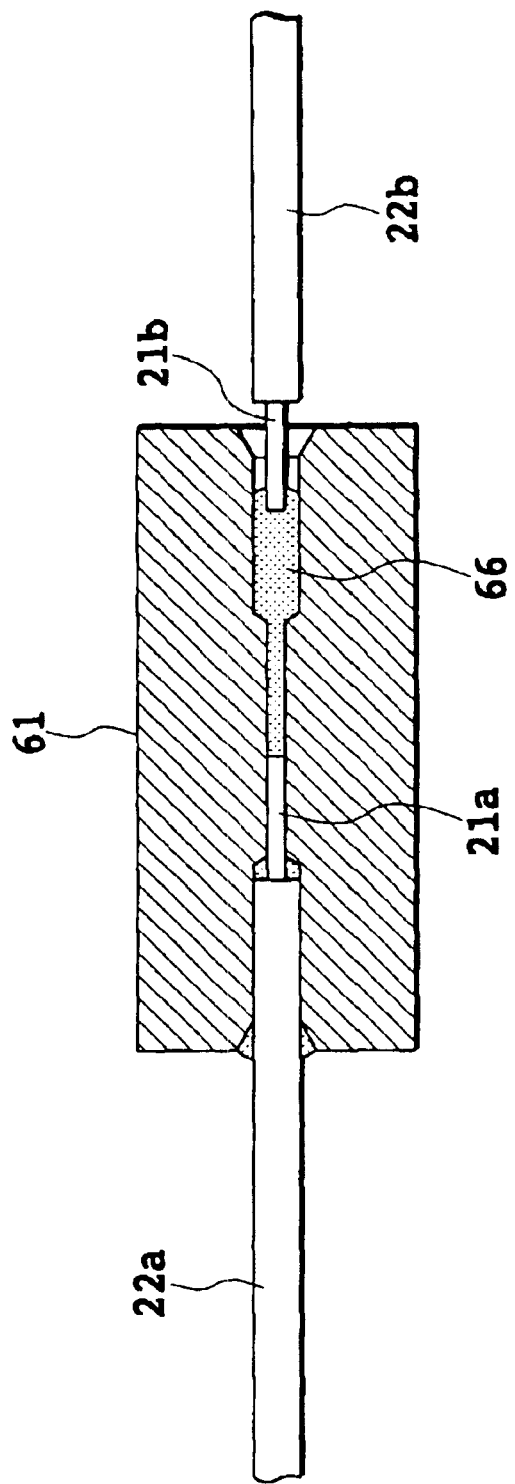
FIG. 8 is a sectional view showing a method of fixing optical fibers using the optical alignment sleeve.

FIG. 8 shows a method of fixing optical fibers using the optical alignment sleeve. When the optical fibers are inserted, an extra portion of an adhesive 66 is moved to the insertion ports 62a and 62b of the optical alignment sleeve through the drain ditch 65 to fix the optical fibers 22a and 22b and the optical alignment sleeve 61 together in the tapered insertion ports 62a and 62b, thereby sealing the optical fibers. The insertion ports 62a and 62b are tapered so as to allow the optical fibers 21a and 21b to be inserted thereinto and are adapted to allow the extra portion of the adhesive 66 to form a sufficient fillet.

[Third Embodiment of Optical Alignment Sleeve]

Figure 9:
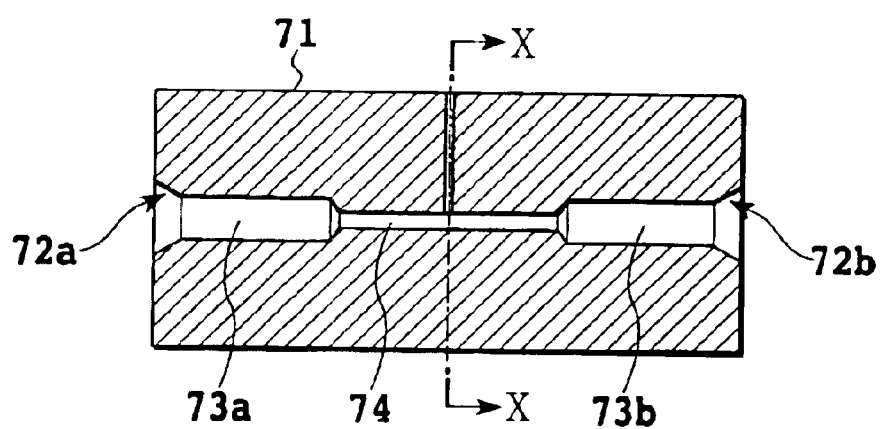
FIG. 9 is a sectional view showing an optical alignment sleeve according to the third embodiment of the present invention.

FIG. 9 shows an optical alignment sleeve according to a third embodiment of the present invention. An optical alignment sleeve 71 is composed of tapered insertion ports 72a and 72b through which the optical fibers 21a and 21b are inserted, larger-diameter holding sections 73a and 73b in which the optical fiber coatings 22a and 22b are held, and a smaller-diameter holding section 74 in which the optical fibers 21a and 21b are held.

Figure 10:
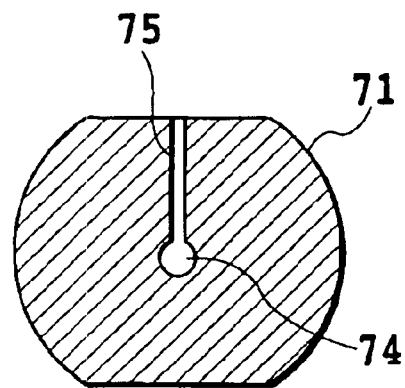
FIG. 10 is a transverse sectional view of a central portion of the optical alignment sleeve according to the third embodiment of the present invention.

FIG. 10 is a transverse sectional view of a central portion of the optical alignment sleeve. This is a transverse sectional view of the smaller-diameter holding section 74, taken along line X—X in FIG. 9. The smaller-diameter holding section 74 has a drain hole 75 through which the adhesive is discharged. Instead of the drain hole 75, a drain slit may be formed over a vertical cross section of the optical alignment sleeve. When the optical fibers are inserted, an extra portion of the adhesive is moved to the drain hole 75, a drain section, to fix the optical fibers and the optical alignment sleeve together, thereby sealing the optical fibers.

The adhesive 66 has a viscosity of 10,000 cP or has its viscosity adjusted so as to be gelated so that even after it has been filled into the optical alignment sleeve 61 or 71, it will not flow out before the optical fibers 21 are inserted or be scattered easily when the optical fibers 21 are inserted.

The adhesive 66 is of an ultraviolet curing type or a visible light curing type. The optical alignment sleeves 61 and 71 are composed of plastics, glass, or zirconia, through which ultraviolet rays or visible light can be transmitted. After the optical fibers have been inserted into the optical alignment sleeve 61 or 71, the adhesive 66 is solidified using ultraviolet rays or visible light. Further, if the optical alignment sleeve 61 or 71 is composed of nondeforming steel, the adhesive 66 should be of a heat-hardening type.

[Four Embodiment of Optical Alignment Sleeve]

Figure 11:
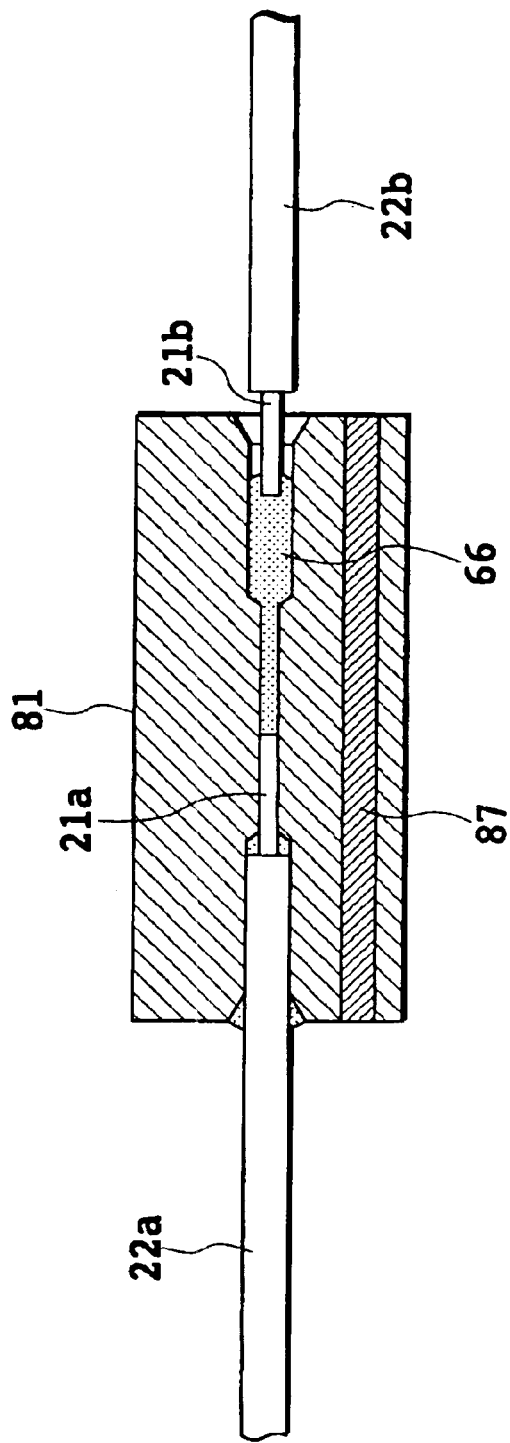
FIG. 11 is a sectional view showing an optical alignment sleeve according to a fourth embodiment of the present invention.

FIG. 11 shows an optical alignment sleeve according to a fourth embodiment of the present invention. An optical alignment sleeve 81 contains a reinforcing rod 87 in addition to the arrangements of the optical alignment sleeve 61 according to the second embodiment, shown in FIG. 6. Further, durability or strength can be increased by butting optical fibers against each other and then covering the optical fibers and the optical alignment sleeve with a heat-shrinkable tube.

[Embodiment of Optical Fiber Connecting Device]

Figure 12A:
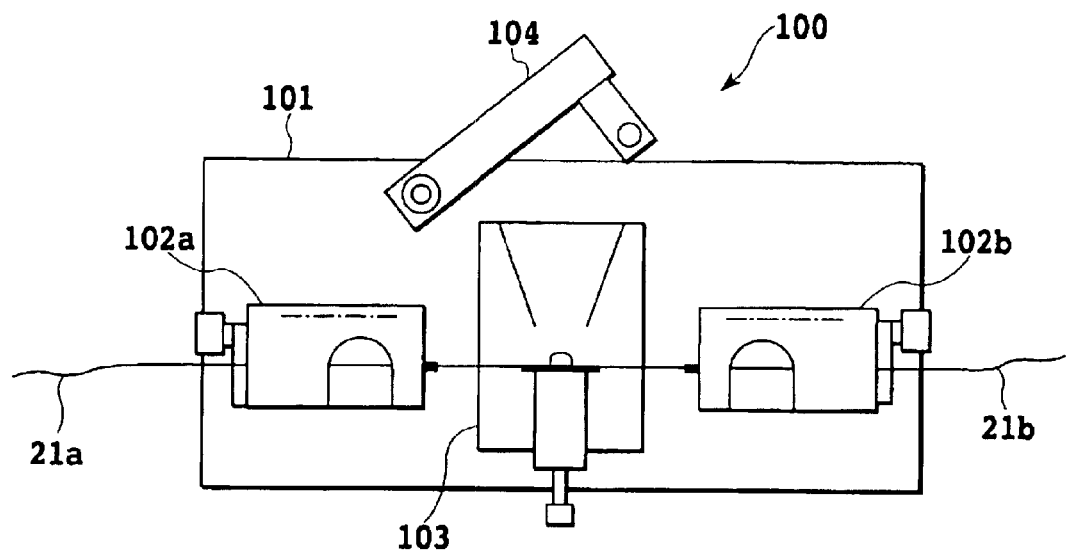
FIG. 12A is a plan view showing an optical fiber connecting device according to one embodiment of the present invention.
Figure 12B:
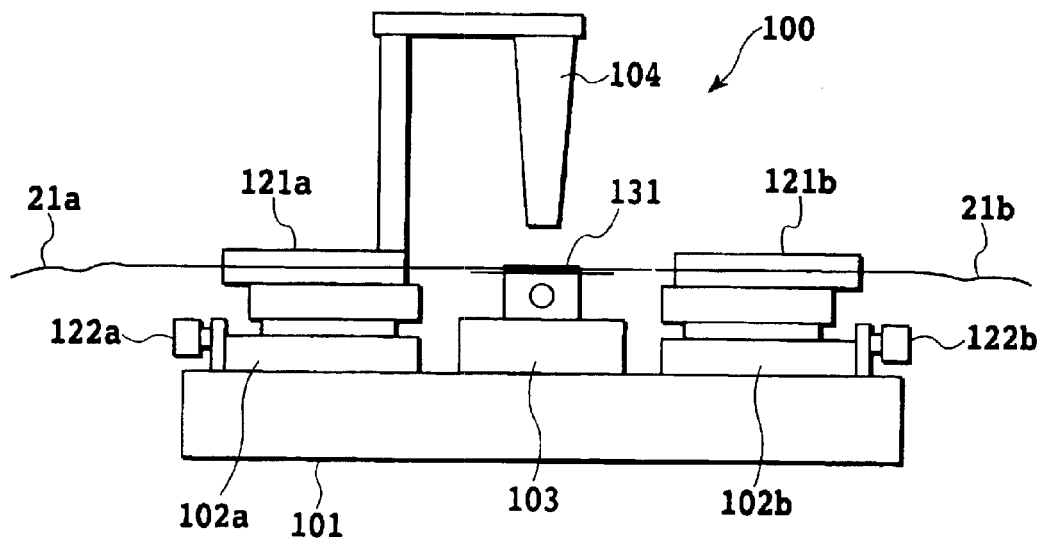
FIG. 12B is a side view showing the optical fiber connecting device according to the embodiment of the present invention shown in FIG. 12A.

FIG. 12A is a plan view of an optical fiber connecting device according to one embodiment of the present invention. FIG. 12B is a side view of the optical fiber connecting device. An optical fiber connecting device 100 comprises a base 101, optical fiber holding sections 102a and 102b that fix the optical fibers 21a and 21b, an optical alignment sleeve holding section 103 that fixes the optical alignment sleeve 61, 71, or 81, and a rotatable microscope 104 that enables magnification of a connection area in which the optical fibers 21a and 21b are butted against each other, the optical fiber holding sections 102a and 102b, optical alignment sleeve holding section 103, and rotatable microscope 104 all being arranged on the base 101. The optical fiber holding sections 102a and 102b each comprise a V-type groove clamps 121a or 121b, respectively, which can be moved in the direction of optical axis of the fixed optical fiber by a fine-tuning screw 122a or 122b, respectively.

Description will be give of a method of connecting optical fibers together using an optical fiber connecting device 100. The optical alignment sleeve 61, 71, or 81 with the adhesive 66 filled therein is fixed to a splicer clamp 131 of the optical alignment sleeve holding section 103. Coated portions at the tips of the optical fibers 21a and 21b are removed. Then, the optical fibers 21a and 21b are fixed in the V type groove clamps 121a and 121b of the optical fiber holding sections 102a and 102b, respectively. The fine-tuning screws 122a and 122b are used to move the V type groove clamps 121a and 121b, respectively, to insert the optical fibers 21a and 21b, respectively, into the optical alignment sleeve 61, 71, or 81. The rotatable microscope 104 is used to confirm that the end surfaces of the left and right optical fibers 21a and 21b. Then, the adhesive 66 is solidified.

Figure 13A:
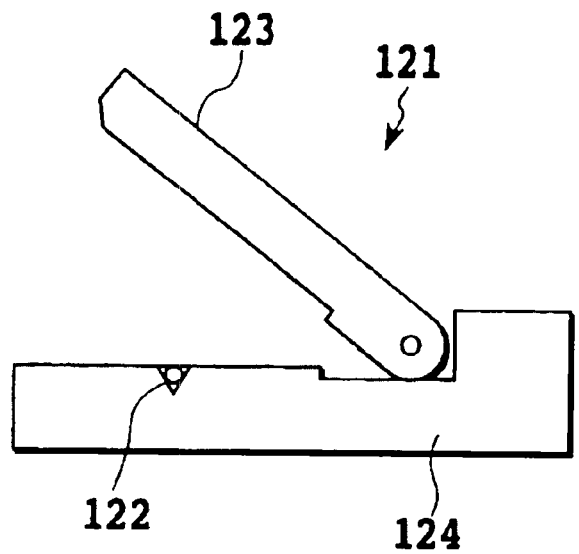
FIG. 13A is a diagram showing a V-type groove clamp of the optical fiber connecting device according to the embodiment of the present invention shown in FIG. 12A.
Figure 13B:
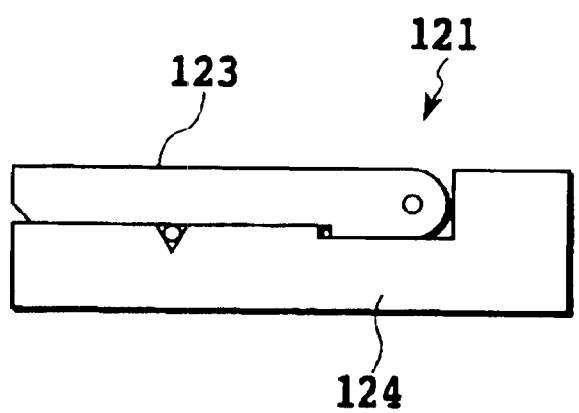
FIG. 13B is a side view showing how the optical fibers are fixed in the V-type groove clamp.

FIG. 13A shows the configuration of the V-type groove clamp of the optical fiber connecting device. The V-type groove clamp 121 is composed of a clamp base 124 having a V-type groove 122 formed therein and in which the optical fibers are placed, and a fixed cover 123 fixed by the clamp base 124 and a hinge. FIG. 13A shows that the fixed cover 123 is open, and FIG. 13B shows that the fixed cover 123 is closed to fix the optical fiber in the V-type groove 122.

Figure 14A:
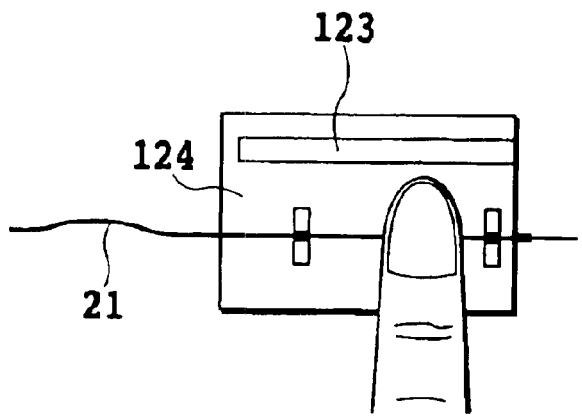
FIG. 14A is a plan view showing a method of fixing the optical fibers in the V-type groove clamp.
Figure 14B:
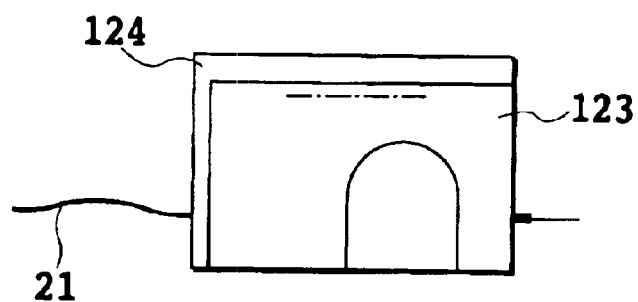
FIG. 14B is a plan view showing the V-type groove clamp with the optical fibers fixed therein.

FIG. 14A shows a method of fixing the optical fibers in the V-type groove. The optical fiber coating 22 is not sufficiently straight because it is coiled repeatedly. However, the optical fiber 21, from which the coated portion has been removed using a tool called a "remover", is adequately straight. Thus, only the tip of the optical fiber 21, i.e. a bare portion of the optical fiber, is projected from one end of the V-type groove clamp 121. Then, the optical fiber 21 is fixed in the V-type groove 122. At this time, the optical fiber 21 is temporarily fixed using one finger (as shown in FIG. 14A). Subsequently, with the optical fiber 21 remaining fixed in this manner, the fixed cover 123 is closed to fix the optical fiber 21 without using the finger (as shown in FIG. 14B).

The optical fiber 21 is thus fixed in the V-type groove 122 while using one finger for temporary fixation, thereby allowing only the bare optical fiber to be guided to the insertion ports 62 or 72 of the optical alignment sleeve 61, 71, or 81, respectively.

The present invention will be described below in further detail on the basis of examples. However, it should be appreciated that the present invention is not limited to these example.

EXAMPLE 1

To connect single-mode optical fibers of outer diameter 0.125 mm together, a transparent polycarbonate resin is used to produce an optical alignment sleeve 61, shown in FIG. 6, by injection molding. The optical alignment sleeve 61 had an inner diameter of 0.127 mm, an outer diameter of 4 mm, and a length of 30 mm and had a 50×100 μm drain ditch 65 formed inside. The optical alignment sleeve 61 is filled with an ultraviolet curing type acrylic-type adhesive having its viscosity adjusted to 20,000 cP.

The optical fibers 21a and 21b were inserted into the optical alignment sleeve 61 and the ends thereof were butted together. Then, the adhesive 66 filled into the optical alignment sleeve moved from the drain ditch 65 to the tapered insertion ports 62a and 62b to form a fillet between the optical fiber coating 22 and the optical alignment sleeve 61. The optical alignment sleeve was irradiated with ultraviolet rays (365 nm) having a quantity of light of 100 mW/cm$^3$, for 60 seconds to solidify the adhesive.

In this case, the single-mode optical fibers 21a and 21b exhibited an insertion loss of 0.03 dB or less at a wavelength of 1.5 μm. In temperature cycling tests at −20 to +60° C., the optical fiber connected portion exhibited an optical loss change of 0.2 dB or less. The optical fiber connected portion had a peel strength of 2 kg and maintained a strength of 2 kg or more even after the fibers had been immersed in 60° C. water for two weeks.

EXAMPLE 2

To connect single-mode optical fibers of outer diameter 0.125 mm together, nondeforming steel having a coefficient of linear expansion of 6×10$^{-7}$/° C. was used to produce an optical alignment sleeve 61, shown in FIG. 6, powder molding. The optical alignment sleeve 61 had an inner diameter of 0.127 mm, an outer diameter of 4 mm, and a length of 30 mm and had a 50×100 μm drain ditch 65 formed inside. The optical alignment sleeve 61 was filled with a heat-hardening type epoxy-type adhesive having its viscosity adjusted to 20,000 cP.

The optical fibers 21a and 21b were inserted into the optical alignment sleeve 61 and the ends thereof were butted together. Then, the adhesive filled into the optical alignment sleeve moved from the drain ditch 65 to the tapered insertion ports 62a and 62b to form a fillet between the optical fiber coating 22 and the optical alignment sleeve 61. The optical alignment sleeve was heated at 120° C. for two minutes to solidify the adhesive.

In this case, the single-mode optical fibers 21a and 21b exhibited an insertion loss of 0.03 dB or less at a wavelength of 1.5 μm. In temperature cycling tests at −20 to +60° C., the optical fiber connected portion exhibited an optical loss change of 0.2 dB or less. The optical fiber connected portion had a peel strength of 2 kg and maintained a strength of 2 kg or more even after the fibers had been immersed in 60° C. water for two weeks.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical fiber connecting element comprising:
   an optical alignment sleeve having tapered insertion ports formed at opposite ends thereof and through which optical fibers are inserted and having an ejection port opened in an area in which the two optical fibers inserted through the insertion ports are butted against each other;
   a cyanoacrylate-type glue injected into said insertion ports and said injection port to fix said two optical fibers; and
   a heat-shrinkable tube wrapped around said optical alignment sleeve and said two optical fibers and having a hot-melt adhesive provided therein.

2. An optical fiber connecting element according to claim 1, further comprising a reinforcing rod inserted into said heat-shrinkable tube.

3. An optical fiber connecting element according to claim 2, wherein said reinforcing rod has a recess in an area in which said reinforcing rod contacts with said optical alignment sleeve.

4. An optical fiber connecting element comprising:
   an optical alignment sleeve having tapered insertion ports formed at opposite ends thereof and through which optical fibers are inserted and having an ejection port opened in an area in which the two optical fibers inserted through the insertion ports are butted against each other;
   a cyanoacrylate-type glue injected into said insertion ports and said injection port to fix said two optical fibers;
   a reinforcing tube wrapped around said optical alignment sleeve and said two optical fibers; and
   seal materials that fix said two optical fibers and said reinforcing tube at opposite ends of the reinforcing tube.

5. An optical fiber connecting method comprising:
   a first step of inserting two optical fibers into an optical alignment sleeve and butting the optical fibers against each other, the optical alignment sleeve having tapered insertion ports formed at opposite ends thereof and through which optical fibers are inserted and having an ejection port opened in an area in which the two optical fibers inserted through the insertion ports are butted against each other;
   a second step of injecting a cyanoacrylate-type adhesive into said insertion ports and said injection port to fix said two optical fibers; and a third step of wrapping a heat-shrinkable tube having a hot-melt adhesive provided inside, around said optical alignment sleeve and said two optical fibers and heating the heat-shrinkable tube to fix said optical alignment sleeve and said two optical fibers.

6. An optical fiber connecting method according to claim 5, wherein said third step includes a step of inserting a reinforcing rod into said heat-shrinkable tube.

7. An optical fiber connecting method comprising the steps of:

inserting two optical fibers into an optical alignment sleeve and butting the optical fibers against each other, the optical alignment sleeve having tapered insertion ports formed at opposite ends thereof and through which optical fibers are inserted and having an ejection port opened in an area in which the two optical fibers inserted through the insertion ports are butted against each other;

injecting a cyanoacrylate-type adhesive into said insertion ports and said injection port to fix said two optical fibers; and wrapping a reinforcing tube around said optical alignment sleeve and said two optical fibers and using seal materials to fix said two optical fibers at opposite ends of the reinforcing tube.

8. An optical alignment sleeve for optical fibers which allows two optical fibers to be butted against each other for connection, the optical alignment sleeve comprising:

tapered insertion ports through which optical fibers are inserted; and holding sections each having a groove formed therein to allow said optical fiber inserted through the insertion port to discharge an extra portion of an adhesive already filled in the optical alignment sleeve, to said insertion ports, and wherein said optical fibers inserted through said insertion ports allow the extra portion of said adhesive discharged to said insertion ports to form fillets.

9. An optical alignment sleeve according to claim 8, wherein said optical alignment sleeve is formed of plastics, glass, or zirconia, through which ultraviolet rays or visible light can be transmitted, and wherein said adhesive is of an ultraviolet curing type or a visible light curing type and has a viscosity of 10,000 cP or more or is like a gel.

10. An optical alignment sleeve according to claim 8, wherein said optical alignment sleeve is formed of nondeforming steel, and wherein said adhesive is of a heat-hardening type and has a viscosity of 10,000 cP or more or is like a gel.

11. An optical alignment sleeve according to claim 8, 9, or 10, further comprising a reinforcing rod extending parallel with said holding sections.

12. An optical alignment sleeve for optical fibers which allows two optical fibers to be butted against each other for connection, the optical alignment sleeve comprising:

tapered insertion ports through which optical fibers are inserted; and holding sections each having a drain section formed therein so that said optical fiber are inserted through the insertion port to discharge an extra portion of an adhesive already filled in the optical alignment sleeve, to said insertion ports, and wherein said optical fibers are inserted through said insertion ports to allow the extra portion of said adhesive discharged to said insertion ports to form fillets.

13. An optical alignment sleeve according to claim 12, wherein said optical alignment sleeve is formed of plastics, glass, or zirconia, through which ultraviolet rays or visible light can be transmitted, and wherein said adhesive is of an ultraviolet curing type or a visible light curing type and has a viscosity of 10,000 cP or more or is like a gel.

14. An optical alignment sleeve according to claim 12, wherein said optical alignment sleeve is formed of nondeforming steel, and wherein said adhesive is of a heat-hardening type and has a viscosity of 10,000 cP or more or is like a gel.

15. An optical alignment sleeve according to claim 12, 13, or 14, further comprising a reinforcing rod extending parallel with said holding sections.

16. An optical fiber connecting method comprising:

a first step of inserting optical fibers into an optical alignment sleeve to discharge an extra portion of an adhesive already filled into holding sections of said optical alignment sleeve, to insertion ports formed at opposite ends of said optical alignment sleeve, via grooves formed in said holding sections;

a second step of inserting said optical fibers into said optical alignment sleeve to allow the extra portion of said adhesive discharged to said tapered insertion ports to form fillets; and a third step of solidifying said adhesive to fix said optical alignment sleeve and said optical fibers.

17. An optical fiber connecting method comprising:

a first step of inserting optical fibers into an optical alignment sleeve to discharge an extra portion of an adhesive already filled into holding sections of said optical alignment sleeve, to a drain section formed at said holding sections;

a second step of inserting said optical fibers into said optical alignment sleeve to allow the extra portion of said adhesive discharged to said drain section to form fillets; and a third step of solidifying said adhesive to fix said optical alignment sleeve and said optical fibers.

18. An optical fiber connecting device comprising:

optical alignment sleeve holding means for fixing an optical alignment sleeve; and optical fiber holding means having a clamp that fixes optical fibers in V-type groove and means for moving said clamp so as to allow said optical fibers to be inserted into said optical alignment sleeve and butted against each other therein, and wherein said clamp has a fixed cover that can be closed with said optical fibers temporarily fixed in said V-type groove formed in a clamp base, using one of the fingers, and said optical fibers are sandwiched between said clam base and said fixed cover in said V-type groove.

19. An optical fiber connecting device according to claim 18, further comprising a microscope that enables magnification of a connection area in which said optical fibers are butted against each other in said optical alignment sleeve.

* * * * *

UNITED STATES PATENT AND TRADEMARK OFFICE
CERTIFICATE OF CORRECTION

PATENT NO. : 6,779,931 B2
DATED : August 24, 2004
INVENTOR(S) : Murata et al.

It is certified that error appears in the above-identified patent and that said Letters Patent is hereby corrected as shown below:

<u>Title page,</u>
Item [73], should read as follows:
-- [73] Assignees: NTT Advanced Technology Corporation of Tokyo (JP);
Telecom Assist Corporation of Chiba (JP);
Richstone Limited of Tokyo (JP);
Ishihara Techno Co., Ltd of Nagano (JP) --

Signed and Sealed this

Eleventh Day of January, 2005

JON W. DUDAS
*Director of the United States Patent and Trademark Office*